(12) United States Patent
Rauba

(10) Patent No.: US 6,735,290 B1
(45) Date of Patent: May 11, 2004

(54) METHOD AND SYSTEM FOR PRE-SETTING LONG DISTANCE CALL CHARGES

(75) Inventor: Ray Rauba, Roswell, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/966,369

(22) Filed: Sep. 28, 2001

(51) Int. Cl.[7] .............................................. H04M 15/00
(52) U.S. Cl. ............................. 379/114.16; 379/114.01; 379/114.03; 379/114.05; 379/114.15; 379/114.17; 379/144.01; 455/405; 455/406
(58) Field of Search ........................... 379/111, 114.01, 379/114.03, 114.05, 114.06, 114.07, 114.15, 114.16, 114.17, 114.26, 114.27, 114.28, 115.01, 115.02, 121.01, 121.02, 127.03, 127.05, 144.01; 455/405, 406, 408, 409

(56) References Cited

U.S. PATENT DOCUMENTS

| | | | |
|---|---|---|---|
| 5,146,491 A | * 9/1992 | Silver et al. ........... | 379/114.01 |
| 5,559,871 A | * 9/1996 | Smith .................... | 379/115.01 |
| 5,675,636 A | * 10/1997 | Gray .................... | 379/114.01 |
| 5,930,343 A | * 7/1999 | Vasquez ................ | 379/115.01 |
| 5,946,380 A | * 8/1999 | Cohen et al. .......... | 379/127.01 |
| 5,963,625 A | * 10/1999 | Kawecki et al. ....... | 379/114.01 |
| 5,987,108 A | * 11/1999 | Jagadish et al. ....... | 379/114.01 |
| 6,122,352 A | * 9/2000 | Kangas et al. ......... | 379/114.01 |
| 6,131,024 A | * 10/2000 | Boltz .................... | 455/405 |
| 6,145,005 A | * 11/2000 | Kirkby ................. | 709/228 |
| 6,597,774 B1 | * 7/2003 | Jennings et al. ...... | 379/114.07 |
| 6,665,387 B2 | * 12/2003 | Hannu ................. | 379/114.16 |

* cited by examiner

*Primary Examiner*—Curtis Kuntz
*Assistant Examiner*—Quoc Duc Tran
(74) *Attorney, Agent, or Firm*—Merchant & Gould

(57) ABSTRACT

A method and system for allowing a user to dynamically pre-determine the duration and/or cost of a domestic or international long distance call is provided. For a selected outbound originating long distance call, the user is given the opportunity to determine the duration or the cost of the long distance call. In one embodiment, the customer dials *XX and the terminating phone number, where XX are predetermined digits. The originating central office recognizes the *XX code as requiring the invocation of an Advanced Intelligent Network (AIN) platform to allow the user to pre-determine the duration and cost of the call. Instructions are provided to the user for setting the length of the call to be connected and the calculated cost of the call would be communicated to the user. Before the call is to be connected to the terminating (dialed) number, the customer may be given the option to reset the duration and cost of the call. Once the connected call approaches the pre-set duration, a brief tone or recording may be played announcing the call is about to end. The user may also be given the option to extend the call if so desired.

15 Claims, 4 Drawing Sheets

METHOD AND SYSTEM FOR PRE-SETTING LONG DISTANCE CALL CHARGES

FIELD OF THE INVENTION

This invention relates generally to a method and system for setting the charges for a long distance call before the call is completed.

BACKGROUND OF THE INVENTION

Sometimes, when making a long distance telephone call, a caller may desire to limit the length and/or cost of the call. For example, a caller making an international long distance phone call may be on a limited budget and may not want to spend tens or even hundreds of dollars on a long distance call. These callers may desire increased control of their long distance charges on a per call basis. Of course, a caller may terminate a call at any time by hanging up the telephone. However, some callers do not feel comfortable ending a call with family and friends because they find it difficult to tactfully and politely end the call. Sometimes, a caller may become engrossed in a conversation and lose track of the time spent on a call and spend more money on the call than they wanted.

It is with respect to these considerations and others that the present invention has been made.

SUMMARY OF THE INVENTION

In accordance with the present invention, the above and other problems are solved by a method and system allowing a user to dynamically pre-determine the duration and/or cost of a domestic or international long distance call is provided. For a selected outbound originating long distance call, the user is given the opportunity to determine the duration or the cost of the long distance call. In one embodiment, the customer dials *XX and the terminating phone number, where XX are predetermined digits. The originating central office recognizes the *XX code as requiring the invocation of an Advanced Intelligent Network (AIN) platform to allow the user to predetermine the duration and cost of the call. Instructions are provided to the user for setting the length of the call to be connected and the calculated cost of the call would be communicated to the user. Before the call is to be connected to the terminating (dialed) number, the customer may be given the option to reset the duration and cost of the call. Once the connected call approaches the pre-set duration, a brief tone or recording may be played announcing the call is about to end. The user may also be given the option to extend the call if so desired.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION

In one embodiment, the invention is a method and system for pre-setting a long distance call charge on a per-call basis. For a selected outbound originating long distance call, the user is given the opportunity to determine the duration or the cost of the long distance call. In one embodiment, the customer dials *XX and the terminating phone number, where XX are predetermined digits. The originating central office recognizes the *XX code as requiring the invocation of an Advanced Intelligent Network (AIN) platform to allow the user to pre-determine the duration and cost of the call. Instructions are provided to the user for setting the length of the call to be connected and the calculated cost of the call would be communicated to the user. Before the call is to be connected to the terminating (dialed) number, the customer may be given the option to reset the duration and cost of the call. Once the connected call approaches the pre-set duration, a brief tone or recording may be played announcing the call is about to end. The user may also be given the option to extend the call if so desired.

Exemplary Operating Environment

Figure 1:
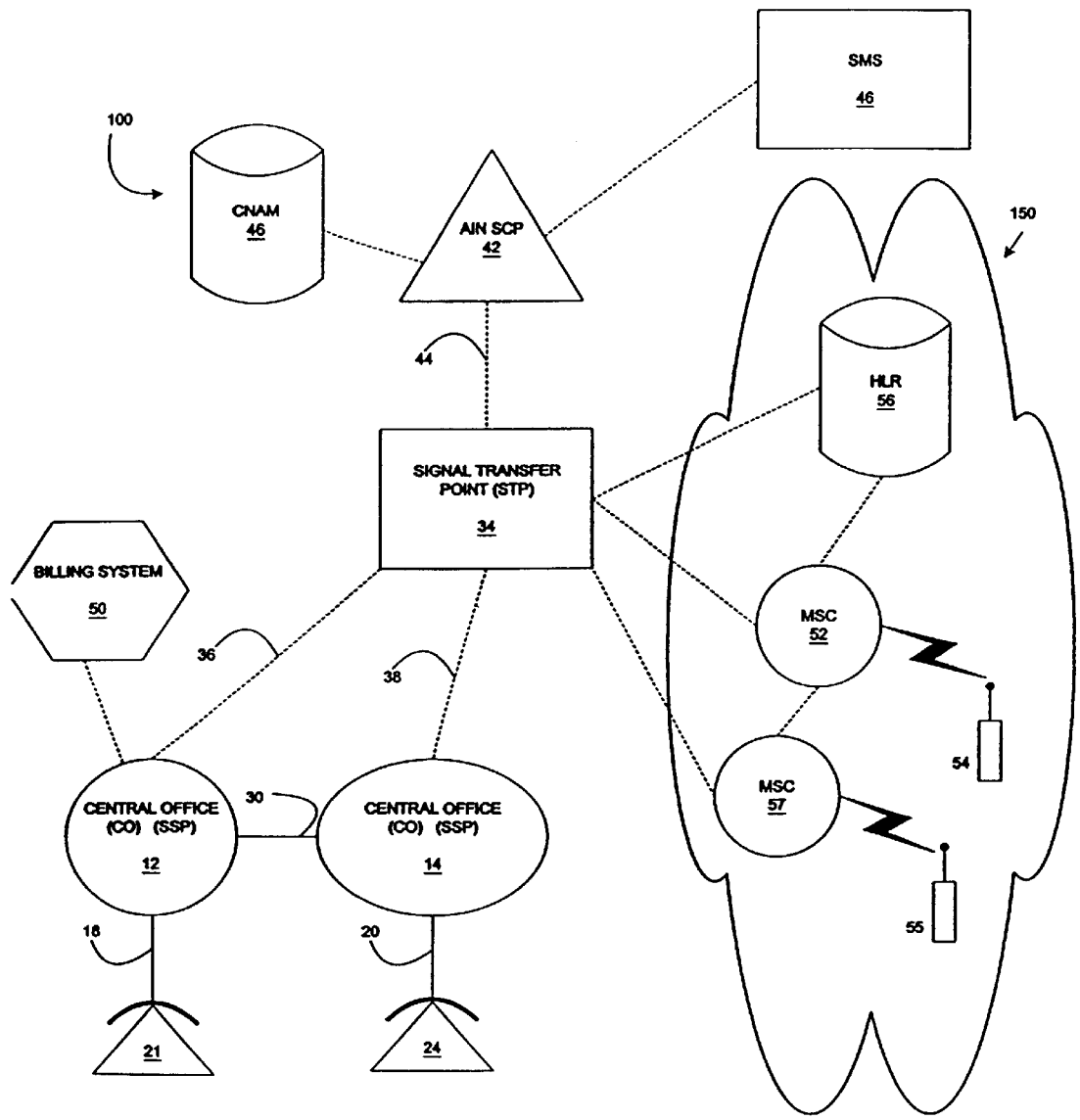
FIG. 1 is a block diagram illustrating components of a wireline and wireless telephone network that provides an exemplary operating environment for the present invention.

It is advantageous to describe an exemplary operating environment in which the current invention may reside to pre-set long distance call charges for both wireline and wireless customers. FIG. 1 is a block diagram illustrating components of a wireline and wireless telephone network that provides an exemplary operating environment for the present invention. Referring now to the drawings, in which like numerals represent like elements throughout the several figures, aspects of the present invention and the advanced intelligent network (AIN) and an integrated wireless network will be described.

The public switched telephone network that evolved in the 1980s incorporated the advanced intelligent network (AIN). Some of the components of the advanced intelligent network are illustrated in FIG. 1. FIG. 1 is a block diagram representing at least a part of the advanced intelligent network (AIN) 100 of a typical local exchange carrier integrated with components of a wireless network 150. The advanced intelligent network (AIN) uses the signaling system 7 (SS7) network for signal or system control message transport. The components thereof are well-known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices are provided in a typical public switched telephone network. As shown in FIG. 1, each central office may include an electronic switch known to those skilled in the art as a service switching point (SSP). These are indicated in FIG. 1 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuit 30.

As shown in FIG. 1, central offices switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. SSP switches 12 and 14 are connected by a plurality of trunk circuits 30. These are the voice path trunks that interconnect the central offices 12 and 14 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local AIN service control point (SCP) 42 that is connected to signal transfer point 34 via SS7 data link 44. As is known to those skilled in the art, AIN service control points, such as AIN SCP 42, are physically implemented by relatively powerful fault tolerant computers. Among the functions performed by the service control points is maintenance of network databases used in providing enhanced services.

Additional devices for implementing advanced network functions within the AIN 10 are provided by regional STPs (not shown), regional AIN SCPs (not shown), and a service management system (SMS) 46. The STP 34 is connected to the SSPs via connections 36 and 38. Both the regional AIN SCPs and the local AIN SCP 42, which represent a plurality of local AIN SCPs distributed throughout the AIN 10, are connected via respective data links to the SMS 46. The SMS 46 provides a centralized platform for remotely programming the various AIN SCPs of the AIN 10 so that a coordinated information processing scheme may be implemented for the AIN 10. The SMS 46 is implemented by a large general purpose computer and interfaces to business offices of the local exchange carrier and interexchange carriers. SSPs download, on a non-real time basis, billing information to a billing system 50 that is needed in order to appropriately invoice subscribers for the services provided.

The AIN SCP 42 is also connected to a caller ED with name (CNAM) database 46. The CNAM database comprises a plurality of directory numbers along with associated names for the directory numbers. The CNAM database may be used to provide a look-up database to provide caller ID service. The CNAM database may comprise directory numbers from wireline customers as well as wireless customers of wireless network 150.

In operation, the intelligent network elements of the AIN 100, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12 and 14, a relatively small set of triggers are defined at the SSP central office switches for each call.

For preparation of billing information, the subscriber's telecommunications service provider is generally responsible for maintaining records for both local and long distance wireline and wireless services and producing billing statements for individual subscribers. The billing system 50, otherwise known as a call accounting system, includes computer systems, memory storage, software, and some mechanical methods for connection to the telephone network described with respect to FIG. 1. A billing system 50 is used to record information about the telephone calls, organize that information, and upon being asked, prepare statements related to subscriber use of telephone services. The information recorded or captured about telephone calls includes all information required to prepare periodic billing statements to subscribers for use of telephone services. Representative information includes type, date, time, duration, originating point and terminating point for telephone calls combined with subscriber information such as calling plan information, discounts provided to a subscriber, and the like.

The billing system 50 produces these billing statements, which are typically mailed to subscribers on a periodic basis. Information may be downloaded from the SSP 12 to the billing system 50 in association with the preparation of the billing statements. The operation of a billing system of a telecommunications service provider, such as the billing system 50, is well-known to those skilled in the art.

It will be appreciated that the billing system 50 may prepare records for each subscriber on a per communication basis. These per communication records for a particular subscriber are typically created by the originating switch that serves the subscriber's line. Preferably, the AIN central office switches, such as SSP 12, create call records detail records (CDR) that contain information on outgoing and incoming phone calls, including originating and terminating parties, originating and terminating destination, time of day, day of the week, duration of the call, type of call (wireline or wireless), and the like. Additionally, the call detail records typically contain call disposition information (e.g. answered, busy, etc.). The per communication call detail records created by the SSP 12 for the subscriber line 18 are periodically downloaded to the billing system 50 on a non-real time basis. The billing system 50 computes the costs for the communications represented by the various records and prepares billing statements to be mailed to the subscribers.

The wireless network 150, such as a cellular network, comprises a mobile switching center (MSC) 52. The MSC 52 is a switch providing services and coordination between wireless users in network 50 and external networks. The MSC 52 may be connected to STP 34 to provide information to the wireline network and receive information from the wireline network. The MSC 52 also communicates with a wireless subscriber, such as wireless telephones 54 and 55. For preparation of billing, the MSCs create call detail records (CDR) similar to the above-described AIN SSPs. The call detail records created by the MSCs are transmitted to the billing system 50 for preparation of periodic wireless subscriber billing.

The MSC 52 may also be connected to a home location register (HLR) 56. The HLR is an SS7 database used to identify/verify a wireless subscriber. The HLR also comprises data related to features and services subscribed to by the wireless subscriber. The HLR is also used during roaming to verify the legitimacy of the subscriber and to provide them with their subscribed features. The HLR 56 may also be connected to the STP 34 and/or SCP 42 of the wireline network. In certain embodiments of the present invention, such as when the calling party is a wireless phone customer, the HLR may be used to provide the calling party's name and calling party's number for the caller ID service.

The environment may also include one or more service nodes (not shown). The service node may be used to implement functions such as voice-to-text and text-to-voice conversions, among other functions. Those skilled in the art are familiar with service nodes, which may be physically implemented by the same types of computers that embody SCPs. In addition to the computing capability and data base maintenance features, service nodes use ISDN lines and may include DTMF signal recognition devices, tone generation devices, voice synthesis devices and other voice or data resources. While service nodes are physically quite similar to SCPs, there are some important differences in their uses.

Service control points normally implement high volume routing or screening services, such as call forwarding and 800 number translation and routing. They are also used for maintenance of and providing access to high volume databases for authorization of billing, such as credit card number validations. In most local exchange carrier networks, service control points are only used for database look-up and routing services that take place prior to the logical completion of the call, i.e., the provision of a ringing signal to the called subscriber line and ring back to the calling subscriber. By contrast, service nodes are used principally when some custom feature or service is needed that requires an audio connection to the call or transfer of a significant amount of data to a subscriber over a switched connection during or following a call.

Method and System for Pre-setting Long Distance Call Charges

Figure 2:
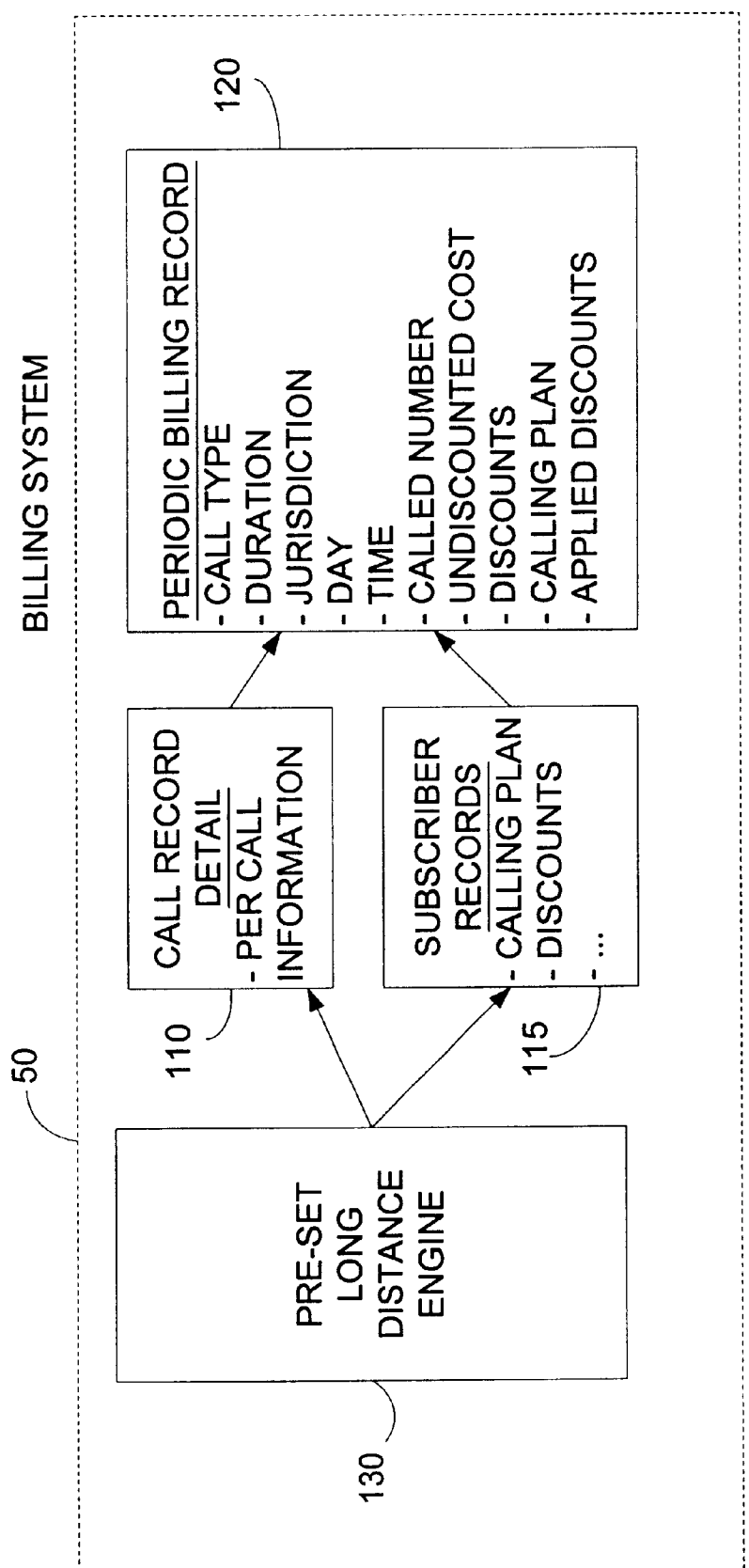
FIG. 2 is a block diagram illustrating the system architecture of an exemplary embodiment of the present invention.

FIG. 2 is a block diagram illustrating the system architecture of an exemplary embodiment of the present invention for pre-setting long distance call charges. As shown in FIG. 2, a call detail record 110 and a subscriber record 115 are utilized in the billing system 50 for creating a periodic billing record 120. According to an exemplary embodiment, the call detail records contain per call information received from the switch 12 each time a subscriber utilizes the telephone services from her telephone 21, as illustrated in FIG. 1. Alternatively, where the subscriber is utilizing wireline services from a wireless telephone set 55, the call detail record will be generated at the MSC 57 and transmitted to the billing system 50. The subscriber record 115 contains information related to the subscriber's telecommunications service plan including the particulars of any calling plans utilized by the subscriber, any discounts provided to the subscriber, and the like.

As is well known to those skilled in the art, on a periodic basis, for example, monthly, the billing system 50 generates a periodic billing record 120 for the preparation of billing to forward to the subscriber for use of the prescribed telecommunications services. Typically, a periodic billing record 120 contains information including the call type, the duration of the call, the jurisdiction of the call, the day and time of the call, the originating number and the called number, the undiscounted cost, any discounts, calling plan and other subscriber information, and any applied discounts. It should be understood, that the periodic billing record 120 may contain other information that is necessary to prepare bills to subscribers for their use of telecommunications services. The jurisdiction of the call includes information regarding the originating point and the terminating point of calls made by the subscriber. The call type may include information, including wireline long distance services, wireless services, calling card calls, assisted calls, etc.

The pre-set long distance engine 130 is a software module containing instructions executable by a computer or other electronic device suitable for analyzing information from the subscriber record 115 and transmitting information to the call detail records 110. The pre-set long distance engine 130 allows a user to pre-set the cost and/or time period of a long distance call. In a preferred embodiment, the pre-set long distance engine 130 communicates in real-time with a SSP so that the length and cost of a call may be determined in real-time.

When the pre-set long distance engine 130 is invoked, the pre-set long distance engine 130 receives the called number and the cost or time period for the call. For example, the pre-set long distance engine may receive a called number of 555-555-1234 and a cost of the call of ten dollars (based on user input). As another example, the pre-set long distance engine may receive a called number of 555-555-1234 and a time period of the call of fifteen minutes (based on user input).

If the time period of the call is received, the pre-set long distance engine calculates the cost of the call based on the calling number, the called number, the time period received and the customer's calling plan (including any discounts). The customer's calling plan and any discounts are retrieved from the subscriber records 115.

If the cost of the call is received, the pre-set long distance engine calculates the time period of the call based on the calling number, the called number, the cost received and the customer's calling plan (including any discounts). The customer's calling plan and any discounts are retrieved from the subscriber records 115.

Once the call is connected, the pre-set long distance engine starts a timer or some other timing mechanism. When the timer is close to the time period determined for the call, an audio warning is issued to the caller that the call is about to be disconnected. The caller may select to add more time or cost to the call in which case the timer is reset based on the new input. Otherwise, when the timer expires, the call is disconnected. In one embodiment, the pre-set long distance engine may periodically poll the call detail record 110 or SSP to determine whether the call has been disconnected and, if not, the pre-set long distance engine may issue a warning when the timer is about to expire and the call is about to be disconnected.

It should be understood that, although the pre-set long distance engine 130 is illustrated as being part of the billing system 50, the engine 130 may be part of the another element in the AIN. For example, the pre-set long distance engine may be part of the SCP 42 or SSP 12, 14. As another example, the pre-set long distance engine may be a stand-alone element connected to the AIN.

Having described an exemplary operating environment and the system architecture for the present invention with reference to FIGS. 1 and 2, a flow diagram illustrating a method 300 for pre-setting a long distance call charge is described with reference to FIGS. 1–4.

Figure 3:
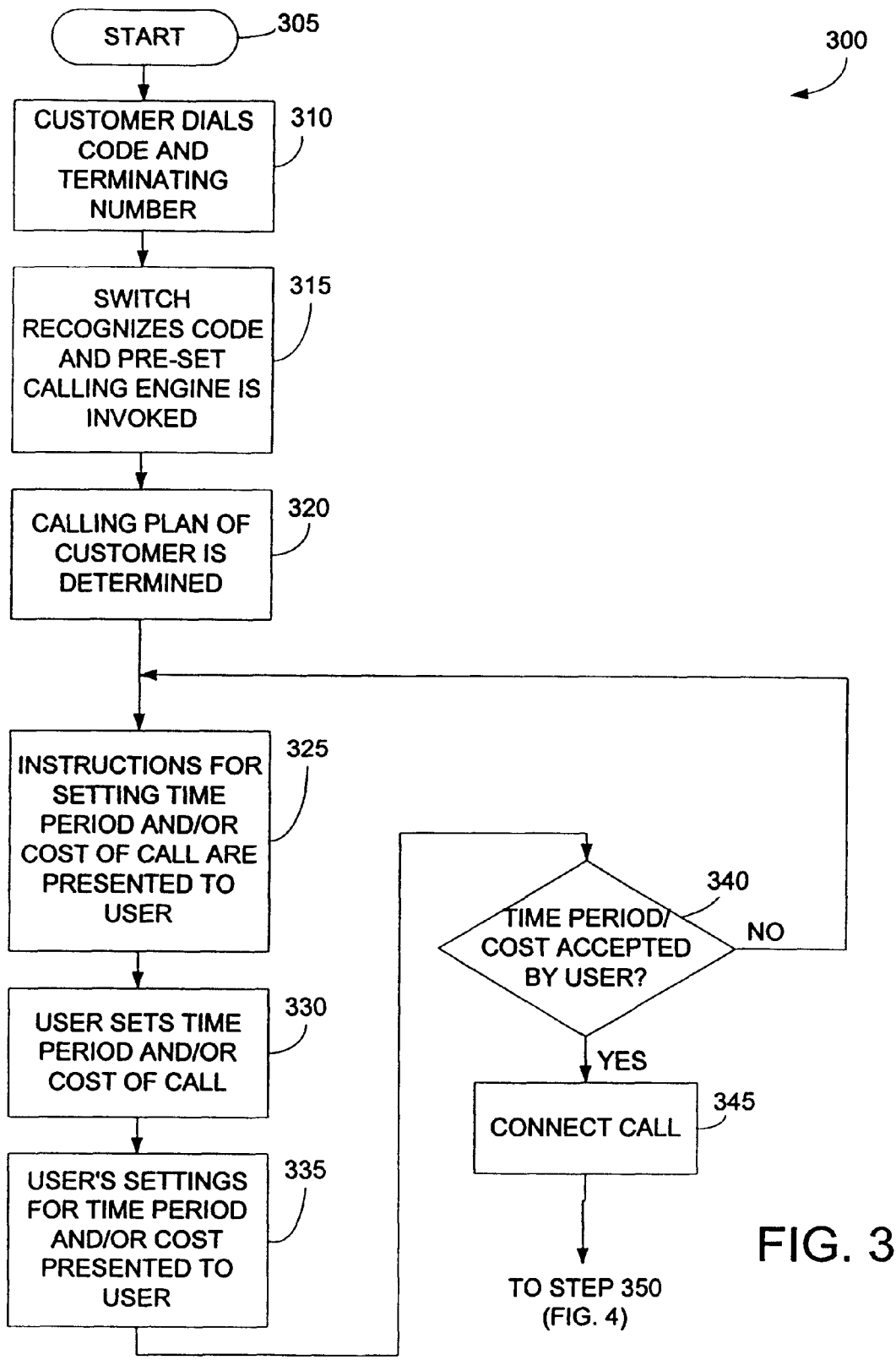
FIGS. 3–4 are a flow diagram illustrating a method for pre-setting long distance call charges in accordance with an embodiment of the present invention.
Figure 4:
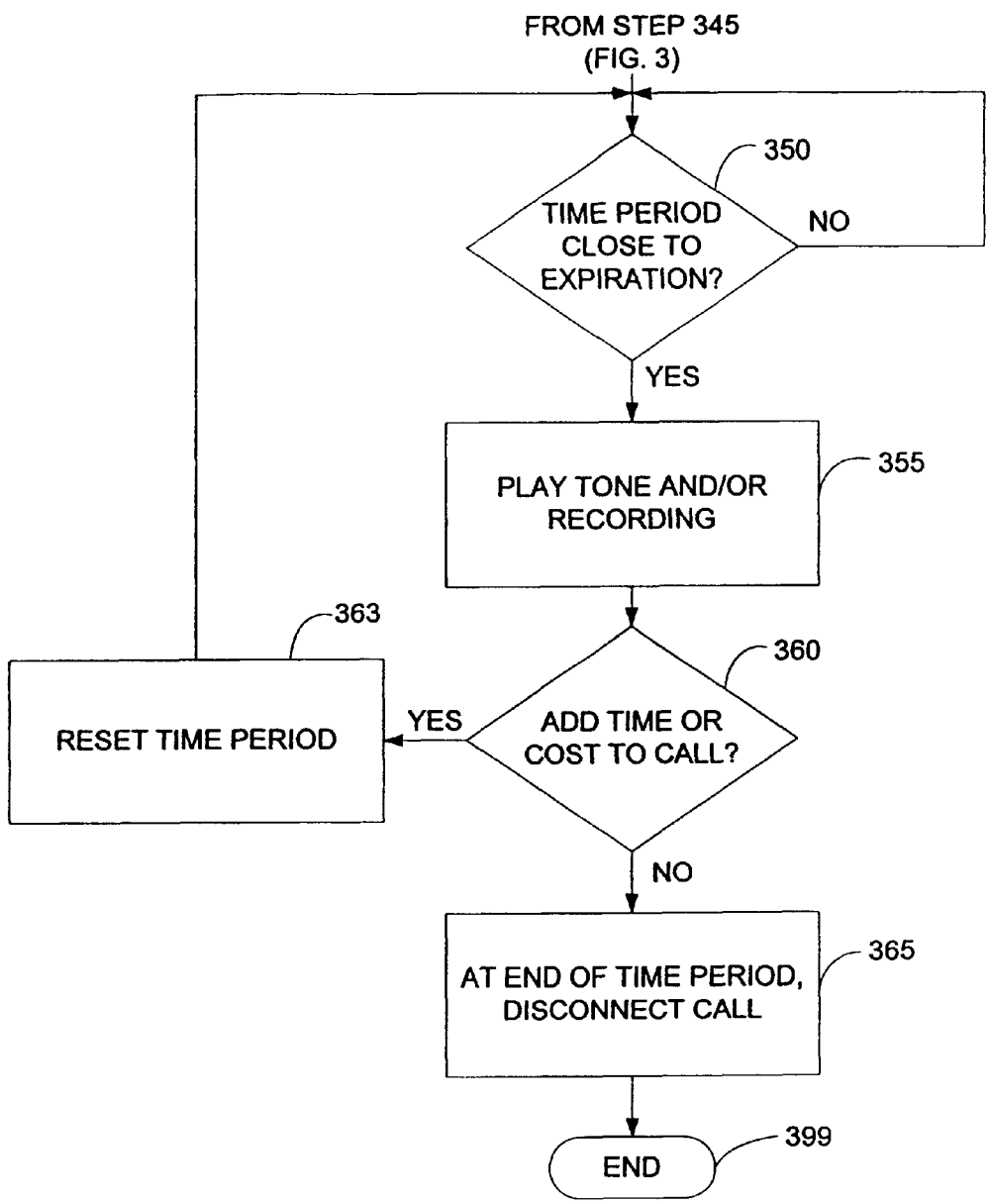

FIGS. 3–4 are a flow diagram illustrating a method 300 for pre-setting long distance call charges in accordance with an embodiment of the present invention. The method 300 starts at step 305 and proceeds to step 310 where a customer dials a predetermined code and a terminating number. The predetermined code may be *XX, where XX are two digits associated with the pre-set calling charge service. The terminating number is the number of the called party that the customer wishes to dial. It should be understood that if the customer is not dialing from the telephone number associated with the customer then the customer may also have to enter his calling card number and password so that his subscriber records may be accessed as will be described below. The method then proceeds to step 315.

At step 315, a switch (such as switch 12 (FIG. 1)) recognizes the predetermined code and the pre-set calling engine 130 (FIG. 2) is invoked. In one embodiment, the predetermined code may provision a trigger at the switch to invoke the pre-set calling engine.

At step 320, the pre-set calling engine determines the calling plan associated with the customer's telephone number. It should be understood that for security purposes a passcode may have to be entered to use the pre-set calling service. It should also be understood that if the customer is not calling from their own telephone number, then the customer may enter his calling card number and password to access the pre-set calling service. The pre-set calling engine determines the calling plan associated with the customer at step 320 based on the telephone number the customer is calling from or based on a calling card number and password entered by the customer. The calling plan is used to determine how much (per minute or some other time interval) is to be charged to the caller for the telephone call.

At step 325, instructions for setting the time period and/or cost of the call are presented to the user. The pre-set calling engine may send instructions to a service node (not shown in FIG. 1) so that the service node via interactive voice response (IVR) audibly presents instructions to the user and receives input from the customer (typically via the telephone keypad). For example, the IVR may play an announcement to the user such as "Please enter the number of minutes of the telephone call followed by the pound sign or the cost of the telephone call followed by the star sign". Alternatively, the request for input from the user may be made in some other format such as in a text message displayed on the telephone or via some other format. The method then proceeds to step 330.

At step 330, the user sets the time period and/or cost of the telephone call. In one embodiment, the customer uses the keypad to input the time period and/or cost. Alternatively, the customer may use any well-known input device including voice recognition software to input the time period and/or cost of the telephone call.

At step 335, the time period or cost of the call is determined and the user's settings for the time period and cost of the call are presented to the user to determine whether or not the user has made a mistake in entering the time period and cost. In one embodiment of the invention, as part of step 335, the pre-set calling engine uses the calling number (the number the customer is calling from), the customer's calling plan, the called number and the time period entered by the user to calculate the cost of the call. In another embodiment of the invention, as part of step 335; the pre-set calling engine uses the calling number (the number the customer is calling from), the customer's calling plan, the called number and the cost entered by the user to calculate the time period of the call. For example, if the user enters ten minutes at step 330, then at step 335 the time period of ten minutes is presented to the user along with the cost of the call such as $5.50. Alternatively, if the user enters $5.50 at step 330, then at step 335 the cost of the call $5.50 and the time period of ten minutes are presented to the user. Step 335 allows the user to review his choices before proceeding with connecting the call.

At decision step 340, it is determined whether the customer has accepted the entered time period/cost. Typically, the user selects a key, such as *, to accept the entered time period/cost or another key, such as #, to reject the entered time period/cost. If the user does not accept the entered time period/cost, then the method returns to step 325 and instructions are presented to the user to enter another time period and/or cost. However, if the user does accept the entered time period/cost, then the method proceeds to step 345 where the call is connected and a timer, or other timing mechanism, begins timing the length of the call.

Referring now to FIG. 4, the method 300 continues after the call is connected between the calling number and the called number. At decision step 350, it is determined, using the timer or some other timing mechanism, whether the time period set for the call is close to expiration. For example, in one embodiment, if the phone call is one minute away from being disconnected, then it is close to expiration. Of course, the amount of time considered close to expiration may be varied in different embodiments.

If the time period is close to expiration, then the method 300 proceeds to step 355. At step 355, a tone, recording, warning, etc. is played to the customer informing him that his pre-set telephone call is about to expire. In one embodiment of the invention, the recording is played by the service node. In one embodiment of the invention, the recording may be heard both by the calling party and the called party so that the called party is also aware that the call is about to be disconnected.

The method then proceeds to decision step 360. At decision step 360, it is determined whether the customer has elected to enter more time/cost to the pre-set telephone call. If so, then the customer uses an input method, such as the keypad of his telephone, to enter more time/cost to the call and the time period is reset at step 363. In another embodiment, the user may elect to disconnect the pre-set service and continue the call as a regular telephone call.

If the user elects not to add more time/cost to the call and does not disconnect the pre-set service, then the method 300 proceeds to step 365.

At step 365, when the time period expires as determined by the timer or another timing mechanism, the call is disconnected and the method ends at step 399.

This invention allows the user to predetermine the duration and/or cost of a long distance or international call about to be connected. The invention may provide a convenient and easy way to budget the cost of long distance calls. The invention may also provide a polite and tactful way to end calls.

As described herein, a system and method are provided for pre-setting long distance call charges. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein. For example, instead of long distance service, the present invention may be used to preset the charges or time periods that apply to other telecommunications services, such as broadband or data services. In these embodiments, the user may also be able to set the amount of bandwidth required for a connection to a terminating point.

I claim:

1. In a telecommunications network, a method of pre-setting a long distance charge for a telephone call from a calling party to a called party, comprising the steps of:

receiving a pre-set charge dialing code and a terminating number;

invoking a pre-set calling engine;

determining a calling plan associated with a calling party;

presenting a set of instructions to the calling party, wherein the instructions describe how to pre-set the long distance charge for the telephone call;

during the telephone call, receiving an indication from the calling party indicating a cost for the telephone call;

determining a time period associated with the telephone call based on the cost and the calling plan;

after determining the time period associated with the telephone call based on the cost and the calling plan, presenting the cost and time period for the call to the calling party;

connecting the telephone call;

determining whether the time period has expired; and if so, then disconnecting the telephone call.

2. The method of claim 1, wherein the step of invoking the pre-set calling engine is performed in response to receiving the pre-set charge dialing code.

3. The method of claim 2 wherein the step of invoking the pre-set calling engine is performed by a switch in response to receiving the pre-set charge dialing code.

4. The method of claim 1 wherein the calling plan associated with the calling party is determined using the calling party number.

5. The method of claim 1 wherein the calling plan associated with the calling party is determined by a calling card number and passcode entered using the calling party.

6. The method of claim 1 wherein before connecting the telephone call, the following steps are performed:

determining whether the presented cost and time period are acceptable to the calling party; and if so, then connecting the telephone call.

7. A telecommunications system for pre-setting a long distance call charge for a telephone call from a calling party to a called party, the system comprising:

a pre-set calling engine, wherein the pre-set calling engine is operative to receive a cost of the long distance call from the calling party while making the telephone call; compute a time period for the telephone call based on the cost, a calling plan associated with the calling party, a calling party number and a called party number; present the cost and time period for the call to the calling party after the time period for the telephone call is computed based on the cost, the calling plan associated with the calling party, the calling party number and the called party number; and wherein the pre-set calling engine is further operative to monitor the telephone call to determine when the time period has expired to send instructions to disconnect the telephone call when this determination has been made; and connected to the pre-set calling engine, a switch associated with a calling party number of the calling party, wherein the switch is operative to receive a pre-set calling code and, in response, to invoke the pre-set calling engine.

8. The system of claim 7 wherein the pre-set calling engine is further operative to determine when the time period is close to expiration and to provide a warning to the calling party that the telephone call is about to be disconnected.

9. The method of claim 7 wherein the pre-set calling engine comprises a computer-readable medium comprising computer-readable instructions.

10. In a telecommunications network, a method of pre-setting a long distance charge for a telephone call from a calling party to a called party, comprising the steps of:

receiving a pre-set charge dialing code and a terminating number;

invoking a pre-set calling engine;

determining a calling plan associated with a calling party;

presenting a set of instructions to the calling party, wherein the instructions describe how to pre-set the long distance charge for the telephone call;

receiving an indication from the calling party indicating a cost for the telephone call;

determining a time period associated with the telephone call based on the cost and the calling plan;

after determining the time period associated with the telephone call based on the cost and the calling plan, presenting the cost and time period for the call to the calling party;

connecting the telephone call;

determining whether the time period has expired;

if so, then disconnecting the telephone call;

if not, then determining whether the time period is within a predetermined time period of expiration;

if so, then playing an announcement to the calling party;

determining whether the calling party has indicated a new time period for the call;

if not, then waiting for the time period to expire or allowing the call to proceed as a normal call; and if so, then resetting the time period to the new time period and repeating the last five steps.

11. The method of claim 10, wherein the step of invoking the pre-set calling engine is performed in response to receiving the pre-set charge dialing code.

12. The method of claim 11 wherein the step of invoking the pre-set calling engine is performed by a switch in response to receiving the pre-set charge dialing code.

13. The method of claim 10 wherein the calling plan associated with the calling party is determined using the calling party number.

14. The method of claim 10 wherein the calling plan associated with the calling party is determined by a calling card number and a passcode entered using the calling party.

15. The method of claim 10 wherein before connecting the telephone call, the following steps are performed:

determining whether the presented cost and time period are acceptable to the calling party; and if so, then connecting the telephone call.

* * * * *